(12) United States Patent
Roper et al.

(10) Patent No.: US 8,590,858 B2
(45) Date of Patent: Nov. 26, 2013

(54) ANTI-GRADIENT CUPPED SEAT FOR PRESSURE REGULATOR

(75) Inventors: Daniel Gunder Roper, Lucas, TX (US); Harold Joe McKinney, Durant, OK (US); Douglas J. Scheffler, McKinney, TX (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 518 days.

(21) Appl. No.: 12/767,427

(22) Filed: Apr. 26, 2010

(65) Prior Publication Data

US 2010/0270490 A1 Oct. 28, 2010

Related U.S. Application Data

(60) Provisional application No. 61/173,194, filed on Apr. 27, 2009.

(51) Int. Cl.
*F16K 31/00* (2006.01)

(52) U.S. Cl.
USPC .......................................... 251/61.3; 251/282

(58) Field of Classification Search
USPC ................................................ 251/61.3, 282
See application file for complete search history.

(56) References Cited

U.S. PATENT DOCUMENTS

| | | | |
|---|---|---|---|
| 3,331,583 A * | 7/1967 | Backer | 251/63.5 |
| 3,670,771 A * | 6/1972 | Dewberry | 137/625.6 |
| 5,791,628 A * | 8/1998 | Wolff et al. | 251/52 |
| 6,152,420 A * | 11/2000 | Hohl | 251/129.02 |
| 6,374,853 B1 | 4/2002 | Callies | |
| 2008/0078460 A1 | 4/2008 | Roper et al. | |

FOREIGN PATENT DOCUMENTS

GB 1 196 302 A 6/1970

OTHER PUBLICATIONS

International Search Report for PCT/US2010/032342, dated Sep. 2, 2010.
Written Opinion for PCT/US2010/032342, dated Sep. 2, 2010.
International Preliminary Report on Patentability for PCT/US2010/032342, dated Nov. 10, 2011.

* cited by examiner

*Primary Examiner* — John K Fristoe, Jr.
*Assistant Examiner* — Reinaldo Sanchez-Medina
(74) *Attorney, Agent, or Firm* — Marshall, Gerstein & Borun LLP

(57) ABSTRACT

A regulator having a valve body defining a flow-path for a fluid and having a valve seat, an actuator casing coupled to the valve body, a control member disposed within the actuator casing and adapted for displacement relative to the valve body and the valve seat for regulating a flow of the fluid through the flow-path by moving between an open position and a closed position wherein the control member engages the valve seat, and a spring operatively coupled to the control member and biasing the control member toward the open position. The control member includes a surface facing the valve seat that is recessed. The recessed surface may be a counter-bore, or may have a convex shape, conical shape, or other appropriate recessed surface. So configured, the regulator displaced improved stability in high inlet pressure, low output pressure, high flow rate implementations.

18 Claims, 3 Drawing Sheets

ANTI-GRADIENT CUPPED SEAT FOR PRESSURE REGULATOR

CROSS-REFERENCE TO RELATED APPLICATION

The present application claims the benefit of priority of Provisional Patent Application No. 61/173,194 filed Apr. 27, 2009. The entire text of the priority application is incorporated herein by reference in its entirety.

FIELD OF THE DISCLOSURE

The present disclosure generally relates to a fluid control device and, more particularly, to a cupped seat design for a fluid control device.

BACKGROUND

Fluid control devices include various categories of equipment including control valves and regulators. Such control devices are adapted to be coupled within a fluid process control system such as chemical treatment systems, natural gas delivery systems, etc., for controlling the flow of a fluid therethrough. Each control device defines a fluid flow-path and includes a control member for adjusting a dimension of the flow-path. For example, FIG. 1 depicts a known regulator assembly 10 including a valve body 12 and an actuator 14. The valve body 12 defines a flow-path 16 and includes a throat 18. In FIG. 1, the regulator assembly 10 is configured in a flow-up configuration. The actuator 14 includes an upper actuator casing 20, a lower actuator casing 22, a diaphragm subassembly 30 including a diaphragm 32, and a control member 24.

The control member 24 is disposed within the upper and lower actuator casings 20, 22 and is adapted for bi-directional displacement in response to changes in pressure across the diaphragm subassembly 30. So configured, the control member 24 controls the flow of fluid through the throat 18. As illustrated and in most applications, the surface proximate the lower end of the control member 24 has a generally convex surface past which the fluid flows when the regulator assembly 10 is in the open position. Additionally, as is depicted, the regulator assembly 10 includes a seat ring 26 disposed in the throat 18 of the valve body 12. When the outlet pressure of the valve body 12 is high, a sealing surface 28 of the control member 24 may sealingly engage the seat ring 26 and close the throat 18. Similarly, absent any pressure in the actuator 14 or upon the failure of the diaphragm 32, a coil spring 34 disposed within an annular cavity portion 36 of the upper actuator casing 20 biases the control member 24 into the closed position. Such a regulator is commonly known as a "fail close" regulator.

"Fail open" regulators operate similar to "fail closed" regulators; however, upon failure of the diaphragm, a spring biases the control member open, rather than closed. Examples of "fail open" regulators are illustrated and described in U.S. Pat. Publ. No. 2008/0078460 A1 by Roper et al., entitled "Positioning Device for Pressure Regulator," which is expressly incorporated by reference herein in its entirety. In regulators such as those taught by Roper et al., the spring may be provided within the control member 24 or otherwise coupled thereto to bias the control member 24 toward the open position. When the diaphragm or other control component fails, fluid continues to flow through the regulator uninterrupted and uncontrolled because the spring opens the regulator assembly. Such configurations therefore often include a monitor regulator, which controls the fluid flow when the "fail open" regulator fails.

In "fail open" regulators such as those taught by Roper et al., it has been observed that operational issue may arise where the "fail open" regulators are installed in high pressure situations. High inlet pressure accompanied by low output pressure can cause control and stability problems for regulators due to additional erratic forces acting on the valve plug. In some instances, these forces can be minimized by increasing the downstream volume of the fluid (i.e., increasing the diameter of the downstream piping) and/or restricting the flow to and from the actuator diaphragm chambers. However, the control problem can sometimes reoccur at higher flow rates even where these corrective measures are implemented, where the force gradient acting on the valve plug causes control issues. In such high flow rate applications, a negative pressure gradient can occur wherein a pressure drop across the valve seat can cause the valve plug to be initially pulled toward the valve seat until spring force overcomes the force produced by the negative pressure gradient, the valve plug my settle into a pattern of high frequency oscillations as the actuator operates to control the response of the regulator. This unstable output may sustain itself due to a lack of stiffness in the actuator system. Therefore, a need exists for an improved "fail open" regulator that maintains a stable output in installations have high inlet pressures, low output pressures, and high flow rates.

DETAILED DESCRIPTION OF THE DISCLOSURE

Figure 1:
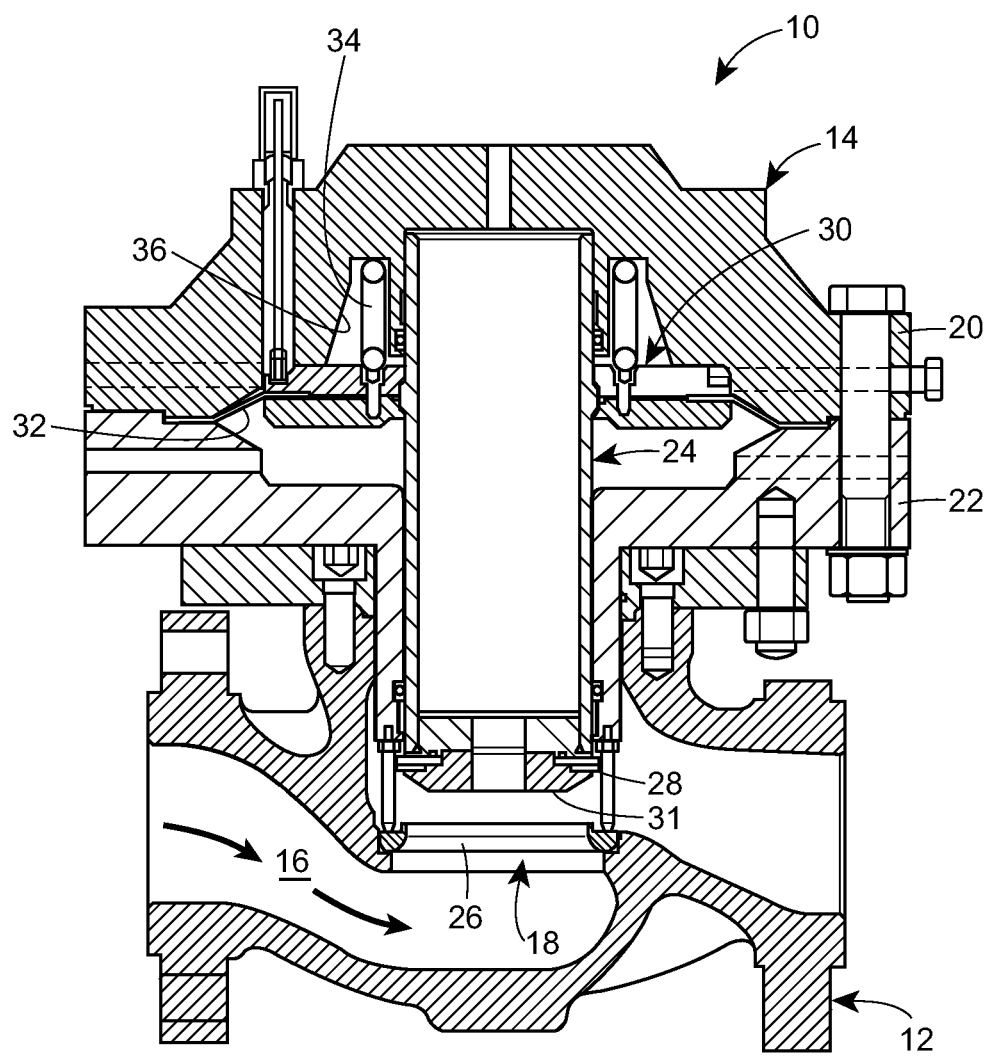
FIG. 1 is a cross-sectional side view of one conventional "fail close" regulator.
Figure 2:
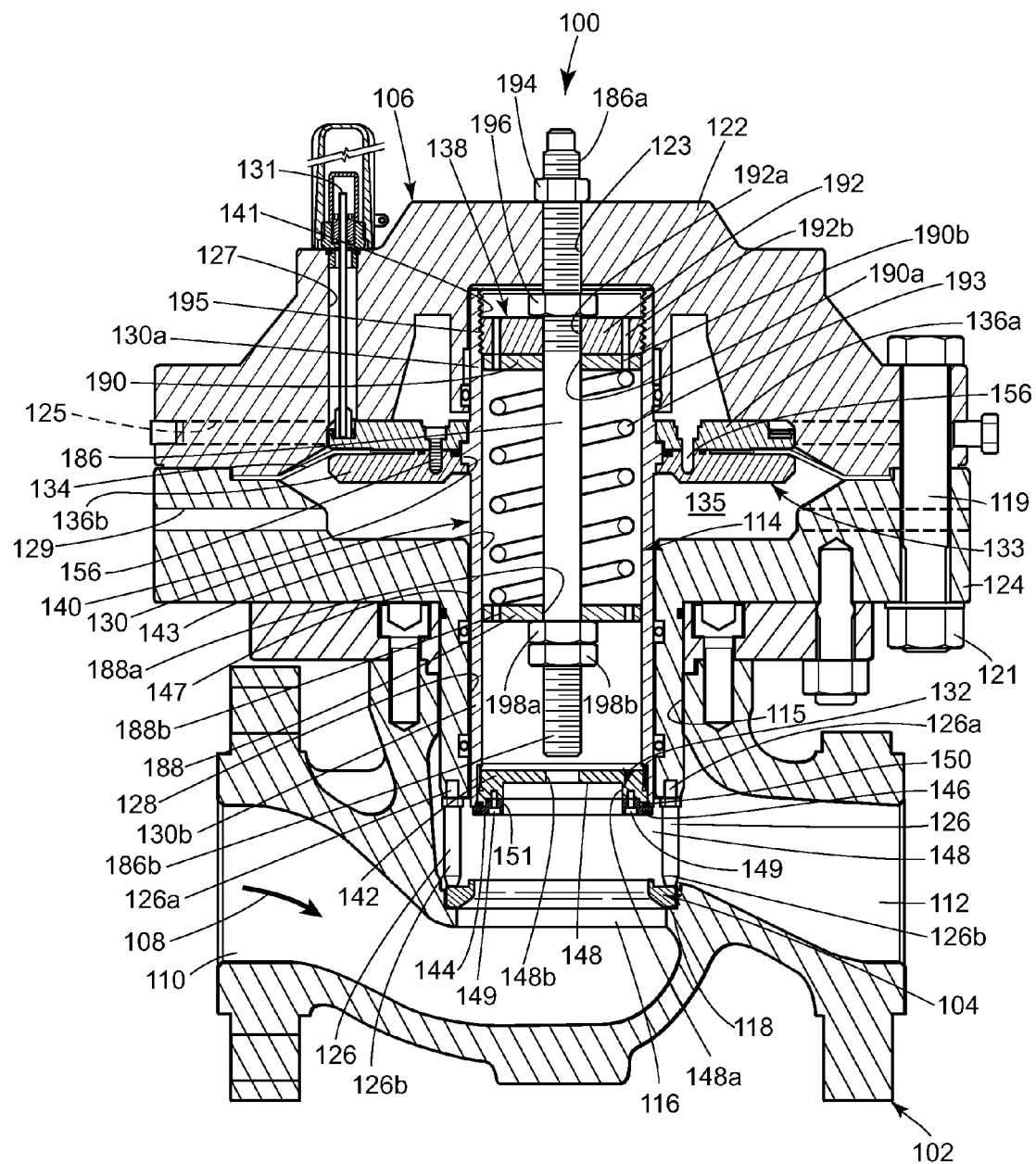
FIG. 2 is a cross-sectional side view of an embodiment of a "fail open" regulator constructed in accordance with the principles of the present disclosure.

Referring to FIG. 2, an embodiment of a control device constructed in accordance with the principles of the present disclosure includes a pressure regulator 100. The pressure regulator 100 generally includes a valve body 102, a seat ring 104, and an actuator 106. The valve body 102 defines a flow-path 108 extending between an inlet 110 and an outlet 112, as well as into the actuator 106, as will be discussed. The actuator 106 includes a control assembly 114 that is moveable between an open position, as is shown in FIG. 2, and a closed position (not shown), wherein the control assembly 114 engages the seat ring 104. Movement of the control assembly 114 occurs in response to fluctuations in the pressure of the fluid at the inlet 110 and outlet 112. Accordingly, the position of the control assembly 114 relative to the seat ring 104 affects a flow capacity of the pressure regulator 100.

The valve body 102 further defines a throat 116 between the inlet 110 and the outlet 112. The throat 116 includes a stepped portion 118 accommodating and supporting the seat ring 104. In one form, an o-ring may be disposed between the seat ring 104 and the stepped portion 118 of the throat 116 to provide a fluid-tight seal therebetween.

The actuator 106, as stated above, includes the control assembly 114 and additionally, an upper actuator casing 122, a lower actuator casing 124, and a plurality of pins 126. The upper and lower actuator casings 122, 124 are secured together by at least one threaded fastener 119 and corresponding nut 121. The upper actuator casing 122 defines a central opening 123, a first control inlet 125 (depicted in phantom), and a travel chamber 127. The travel chamber 127 contains a travel indicator 131, which indicates the position of the control assembly 114 within the actuator 106. The lower actuator casing 124 defines a second control inlet 129.

In cooperation, the upper and lower actuator casings 122, 124 define a cavity 135 including a hollow neck 128. The hollow neck 128 is disposed within an actuator opening 115 in the valve body 102. As identified in FIG. 2, the plurality of pins 126 have first ends 126a fixed to the hollow neck 128 and second ends 126b located distally to the hollow neck 128. In the form illustrated, the first ends 126a are threaded into bores formed in the hollow neck 128. The second ends 126b engage the seat ring 104. Accordingly, the pins 126 and the stepped portion 118 of the throat 116 sandwich and axially locate and secure the seat ring 104 in the valve body 102. While the regulator 100 has been described as including a plurality of pins 126 locating the seat ring 104 relative to the valve body 102, an alternate form of the regulator 100 may include a cage disposed in the throat 116 to locate the seat ring 104. In another form, the seat ring 104 may be threaded, adhered, or otherwise fixed to the valve body 102.

Still referring to FIG. 2, the control assembly 114 includes a control member such as a hollow sleeve 130, a mounting subassembly 132, a diaphragm subassembly 133, and a positioning device assembly 138. The sleeve 130 is generally tubular defining a generally cylindrical inner surface 143 and a generally cylindrical outer surface 147. The inner surface 143 defines a central bore through the sleeve 130. Additionally, the sleeve 130 includes an upper end 130a and a lower end 130b. The upper end 130a is disposed within the cavity 135 and the lower end 130b is disposed within the hollow neck 128 of the lower actuator casing 124. The upper end 130a of the sleeve 130 is open and includes a circumferential flange 140 formed on the outer surface 147. Additionally, the upper portion 130a of the sleeve 130 includes a threaded portion 141 on the inner surface 143. The lower end 130b of the sleeve 130 is open and accommodates the mounting subassembly 132.

Figure 3:
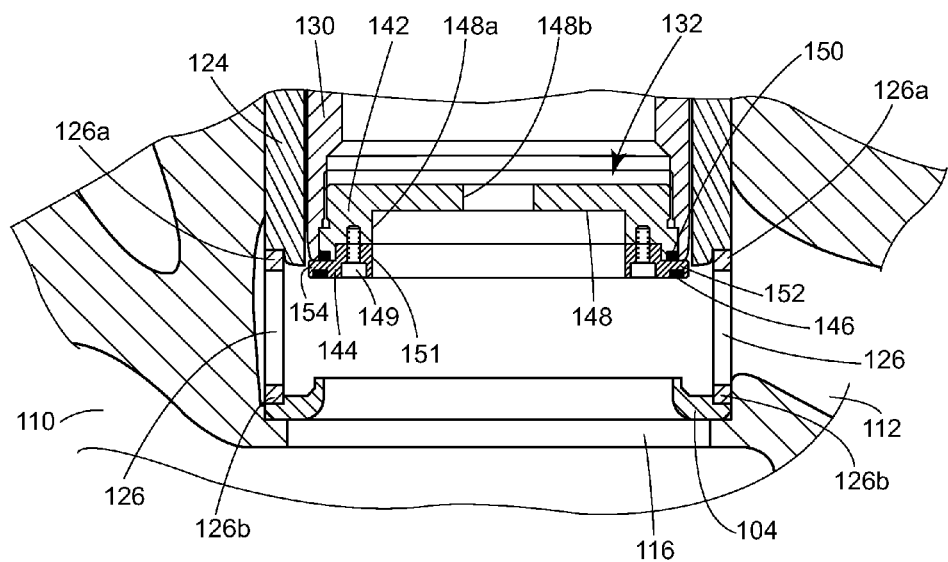
FIG. 3 is an enlarged cross-sectional side view of the throat and mounting assembly of the regulator of FIG. 1 in an open position.
Figure 4:
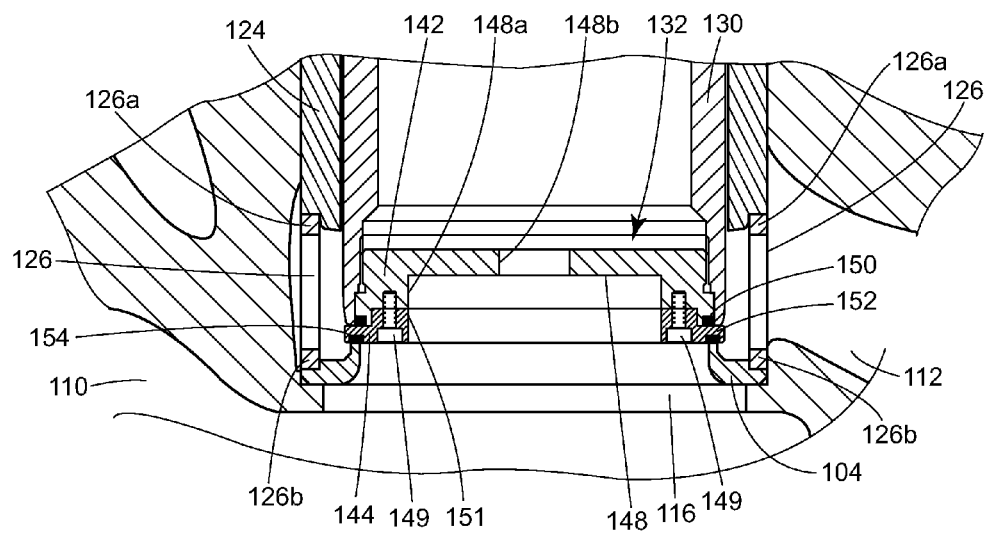
FIG. 4 is an enlarged cross-sectional side view of the throat and mounting assembly of the regulator of FIG. 1 in a closed position.

As best illustrated in FIGS. 3 and 4, the mounting subassembly 132 includes a mounting member or sleeve adaptor 142, a disk holder 144, and an annular sealing disk or molded seat 146. In the disclosed form, the sleeve adaptor 142 includes a generally cylindrical body threaded into the open lower end 130b of the sleeve 130 and defining a counter-bore 148. The counter-bore 148 forms a recessed bottom surface of the sleeve 130. The counter-bore 148 is generally axially aligned with the sleeve 130, with a large diameter portion 148a being disposed on the throat side of the sleeve adaptor 142 and a small diameter portion 148b opening into the interior of the hollow sleeve 130. The disk holder 144 includes a generally cylindrical body fixed to the sleeve adaptor 142 with one or more fasteners 149, and may include an O-ring 150 there between to form a seal. In the form illustrated, the fasteners 149 include threaded fasteners. The disk holder 144 defines a through-bore 151 having a diameter substantially identical to the diameter of the large diameter portion 148a of the counter-bore 148 in the sleeve adaptor 142 and is axially aligned therewith.

As depicted, the disk holder 144 may further include an outwardly extending flange 152 having a top surface engaging the second end 130b of the hollow sleeve 130 and/or the O-ring 150. At a bottom surface of the disk holder 144 or the flange 152 when it is provided, an annular groove 154 is defined and configured to receive the molded seat 146 therein. The molded seat 146 is a generally ring-shaped disk made of a resilient material and fixed in the groove 154 of the disk holder 144. In one form, the molded seat 146 is fixed in the groove 154 of the disk holder 144 with an adhesive. The molded seat 146 and the groove 154 are configured to correspond to the shape of the seat ring 104, with the molded seat 146 being compressed against the seat ring 104 when the control assembly 114 is in a closed position as shown in FIG. 4.

Referring now to the upper portion of the regulator 100 depicted in FIG. 2, the diaphragm subassembly 133 includes a diaphragm 134, an upper diaphragm plate 136a and a lower diaphragm plate 136b. The upper and lower diaphragm plates 136a, 136b are clamped onto the circumferential flange 140 of the sleeve 130. The diaphragm plates 136a, 136b are secured together via fasteners 156, thereby fixing the sleeve 130 and the diaphragm plates 136a, 136b together. Additionally, the diaphragm plates 136a, 136b sandwich a radially inward portion of the diaphragm 134. A radially outward portion of the diaphragm 134 is fixed between the upper and lower actuator casings 122, 124.

The positioning device assembly 138 is primarily disposed within the sleeve 130 to bias the sleeve 130 into the open position depicted in FIG. 2. The positioning device assembly 138 generally comprises a central rod 186, a first spring seat 188, a second spring seat 190, biasing member such as a spring 193, and a retention plate 192. The central rod 186 includes a first threaded end 186a and a second threaded end 186b. The first threaded end 186a extends through the central opening 123 of the upper actuator casing 122. An external nut 194 is threaded onto the first threaded end 186a to limit axial displacement of the central rod 186 in the downward direction relative to the orientation of the actuator 100 depicted in FIG. 2. An intermediate nut 196 is threaded onto the first threaded end 186a of the central rod 186 beyond the external nut 194 to limit axial displacement of the central rod 186 in the upward direction relative to the orientation of the actuator 100 depicted in FIG. 2. Accordingly, the first threaded end 186a of the central rod 186 is effectively fixed against axial displacement relative to the upper actuator casing 122 and the second threaded end 186b extends into the actuator 106.

Accordingly, as depicted, the second threaded end 186b of the central rod 186 extends into the sleeve 130 and is disposed adjacent the second end 130b of the sleeve 130. A pair of retention nuts 198a, 198b are threaded onto the second threaded end 186b of the central rod 186. The retention nuts 198a, 198b support the first spring seat 188, the spring 193, and the second spring seat 192 on the central rod 186. The first spring seat 188 is slidably disposed within the sleeve 130, as will be discussed in more detail below. More specifically, the first spring seat 188 comprises a generally cylindrical plate in engagement with the retention nuts 198a, 198b. The spring 193 therefore fixes the second spring seat 190 against the retention plate 192, and relative to the sleeve 130. Moreover, the first spring seat 188 is fixed relative to the central rod 186 and defines a central opening 188a and a plurality of apertures 188b. The central opening 188a receives the second end 186b of the central rod 186 directly adjacent the retention nuts 198a, 198b. The plurality of apertures 188b are in fluid communication with the counter-bore 148 and through-bore 151 in the mounting subassembly 132, and therefore the flow-path 108.

Similarly, the second spring seat 190 comprises a generally cylindrical plate defining a central opening 190a and a plurality of apertures 190b. The central opening 190a in the second spring seat 190 receives the central rod 186 near the first threaded end 186a. The plurality of apertures 190b are in fluid communication with the plurality of apertures 188b in the first spring seat 188, and therefore the flow-path 108. Accordingly, as depicted, the spring 193 is disposed axially between and in engagement with the first spring seat 188 and the second spring seat 190. The first spring seat 188, which is fixed by the retention nuts 198 against displacement in the downward direction relative to the central rod 186, supports the spring 193. Thus, the spring 193 supports the second spring seat 190.

Moreover, the retention plate 192 comprises a generally cylindrical plate defining a central opening 192a, a plurality of apertures 192b, and a threaded portion 195. The threaded portion 195 of the retention plate 192 is fixed by threaded engagement with the threaded portion 141 on the inner surface 143 of the sleeve 130. Accordingly, the retention plate 192 and the sleeve 130 act as a unitary structure.

During assembly, with the upper actuator casing 122 removed from the lower actuator casing 124 and the sleeve 130 removed from between the diaphragm plates 136a, 136b, the retention plate 192 is threaded into the threaded portion 141 of the sleeve 130. Subsequently, the intermediate nut 196 is threaded onto the first threaded end 186a of the central rod 186. The second threaded end 186b of the central rod 186 is then disposed through the central opening 192a of the retention plate 192. Next, with the central rod 186 in place, the second spring seat 190, the spring 193, and the first spring seat 188 are slid onto the central rod 186, in that order, via the opening in the lower portion 130b of the sleeve 130. The retention nuts 198a, 198b are then threaded onto the second threaded end 186b of the central rod 186, as depicted.

At this point, a technician or engineer may preload the positioning device assembly 138 by tightening either the intermediate nut 196 disposed adjacent the retention plate 192 or the retention nuts 198a, 198b disposed adjacent the first spring seat 188. For example, tightening the intermediate nut 196 pulls the central rod 186 through the second spring seat 190 and the retention plate 192. This causes the retention nuts 198a, 198b to apply an axial force to the first spring seat 188 and displace the first spring seat 188 toward the second spring seat 190. Continued tightening of the intermediate nut 196 compresses the spring 193 between the first and second spring seats 188, 190.

Alternatively, tightening the retention nuts 198a, 198b disposed adjacent the first spring seat 188 forces the first spring seat 188 toward the second spring seat 190 to compress the spring 193. It should be appreciated that in the depicted embodiment, the retention nuts 198a, 198b comprise a first retention nut 198a disposed directly adjacent the first spring seat 188 and a second retention nut 198b disposed directly adjacent the first retention nut 198a opposite the first spring seat 188. Accordingly, in the above-described preloading operation, a technician or engineer would first tighten the first retention nut 198a to displace the first spring seat 188 to compress the spring 193. Subsequently, the technician or engineer would tighten the second retention nut 198b into engagement with the first retention nut 198a to effectively lock the first retention nut 198a in place on the central rod 186.

Additionally, it should be appreciated that in one embodiment of the positioning device assembly 138 disclosed herein, the central rod 186 may comprise markings along the lengths of at least one of the threaded portions 186a, 186b, such that the technician or engineer performing either of the above-described pre-loading operations may tighten the intermediate nut 196 or the retention nuts 198a, 198b to a predetermined position on the central rod 186, thereby pre-loading the spring 193 a predetermined amount.

With the positioning device assembly 138 appropriately pre-loaded, the circumferential flange 140 of the sleeve 130 is coupled into the diaphragm plates 136a, 136b and the lower portion 130b of the sleeve 130 is disposed within the neck 128 of the lower actuator casing 124. The upper actuator casing 122 is then positioned onto the lower actuator casing 124 such that the first threaded end 186a of the central rod 186 is disposed through the central opening 123. A technician or engineer can then secure the upper actuator casing 122 to the lower actuator casing 124 with the threaded fasteners 119. Finally, the technician or engineer tightens the external nut 194 onto the first threaded end 186a of the central rod 186. Tightening the external nut 194 pulls the central rod 186, and therefore the intermediate nut 196 and the first spring seat 188 upward relative to the orientation of the regulator 100 depicted in FIG. 2. The external nut 194 and the intermediate nut 196 sandwich the upper actuator casing 122, as depicted. So configured, the external nut 194 and the intermediate nut 196 fix the central rod 186 against axial displacement relative to the upper actuator casing 122. Additionally, the retention nuts 198a, 198b fix the first spring seat 188 against axial displacement in the downward direction relative to the orientation of the regulator 100 depicted in FIG. 2.

In general, when the regulator assembly 100 is installed within a fluid process control or fluid delivery system, the control assembly 114 is able to reciprocally displace within the cavity 135 and hollow neck 128 of the actuator 106 based on the pressure of the fluid at the inlet 110 and outlet 112 of the valve body 102. Specifically, fluid flows from the inlet 110 and through the throat 116. Once the fluid passes through the throat 116, a substantial portion of the fluid flows to the outlet 112, while the remainder flows through the through-bore 151 and counter-bore 148 in the disk holder 144 and sleeve adaptor 142, respectively. That portion of the fluid continues to flow through the sleeve 130 via the apertures 188b, 190b, 192b in the first and second spring seats 188, 190 and retention plate 192, respectively, to balance the control assembly 114. In the disclosed embodiment, the apertures 190b in the second spring seat 190 are substantially aligned with the apertures 192b in the retention plate 192. This ensures that pressurized fluid traveling through the regulator 100 can pass through the apertures 190b, 192b without obstruction to balance the control assembly 114. In one embodiment, one of the second spring seat 190 and the retention plate 192 may include a dimple on an axially disposed surface thereof. The other of the second spring seat 190 and retention plate 192 may include a recess for receiving the dimple. The recess would only receive the dimple when the second spring seat 190 and retention plate 192 are properly aligned to permit fluid communication between the apertures 190b, 192b, as depicted. Alternatively, in another embodiment the second spring seat 190 and retention plate 192 may comprise a single unitary member, thereby alleviating the need for specific alignment. In yet another alternative embodiment, the apertures 190b and 192b may comprise elongated apertures extending at least partially circumferentially about the spring seat 190 and the retention plate 192. So configured, the second spring seat 190 and retention plate 192 may be arranged in a plurality of relative positions and still provide the necessary fluid communication between the apertures 190b, 192b.

A portion of the fluid that flows through the valve body 102 and to the outlet 112 flows back into the fluid process control or fluid delivery system. Specifically, in one form, the pressure of the fluid at the outlet 112 is bled off into another fluid line (not shown) and directed to the second control inlet 129 in the lower actuator casing 124. Hence, the pressure at the outlet 112 of the valve body 102 equals the pressure at the second control inlet 129, which is ultimately applied to the lower diaphragm plate 136b. In other implementations, a supply pressure regulator (not shown) may be provided that receives the fluid from the outlet 112 and outputs a loading pressure to the second control inlet 129. Additionally, in one form, the pressure at the inlet 110 is bled off into another fluid line to a pilot valve (not shown) that in turn outputs a pilot supply pressure to the first inlet control 125 in the upper actuator casing 122 and, in some implementations, to the supply pressure regulator.

Regardless of the sources of the pressure input at the first and second control inlets 125, 129, the pressure at the first control inlet 125 acts on the diaphragm assembly 133 to bias the pressure regulator 100 toward the closed position, and the pressure at the second control inlet 129 and the force of the spring 193 act on the diaphragm assembly to bias the pressure regulator 100 toward the closed position. Consequently, when the pressure at the first control inlet 125 applies a force to the upper diaphragm plate 136a that is greater than a force applied by the pressure at the second control inlet 129 in combination with the positioning device assembly 138 and, more particularly, the spring 193 of the positioning device assembly 138, the diaphragm plates 136a, 136b and the control sleeve 130 displace downward against the bias of the spring 138. More specifically, the diaphragm plates 136a, 136b and the sleeve 130, as well as the retention plate 192 and the second spring seat 190 of the positioning device assembly 138 displace downward. This downward displacement compresses the spring 193 toward the first spring seat 188. Hence, it should be appreciated that as the sleeve 130 slidably displaces downward, the central rod 186 and the first spring seat 188 remain in the position depicted in FIG. 2, while the sleeve 130, retention plate 192, and second spring seat 190 displace downwardly to bring the molded seat 146 into engagement with the seat ring 104 as shown in FIG. 4.

Alternately, when the pressure at the second control inlet 129 in combination with the spring 193 applies a force to the control assembly 114 that is greater than the pressure at the first control inlet 125, the control assembly 114 displaces upward toward the open position depicted in FIGS. 2 and 3. The sum of the upward forces acting on the diaphragm 134 is opposed by the pressure at the first control inlet 125, which serves as a controlling pressure, to position the control assembly 114 including the sleeve 130 according to the flow required to meet a downstream demand. Additionally, if the diaphragm 134 happened to fail due to a tear in the diaphragm material, for example, the spring 193 would apply a force on the second spring seat 190, which, in turn, forces the control assembly 114 to the open position depicted in FIG. 2.

In contrast to regulators having flat, convex or otherwise protruding surfaces over which the fluid flows when the valve is open, the cupped seat having a recessed surface as provided by the mounting assembly 132 as illustrated and described herein does not experience high frequency oscillations at high flow rates in application with high inlet pressures and low output pressures. The change in the mounting assembly 132 to incorporate the recessed surface correspondingly changes the flow path of the fluid passing through the throat 116 to reduce the pressure gradient acting on the valve plug. The pressure drop across the valve plug is reduced, as is the negative pressure gradient tending to cause the valve plug to drop toward the seat ring 104. The resulting pressure regulator 100 performs with greater stability at high flow rates without the high frequency oscillations observed in previous pressure regulators.

Those skilled in the art will understand that the pressure regulator 100 as illustrated and described herein may be implemented with alternative configurations of mounting assemblies 132 and/or valve plugs having cupped or concave surfaces. For example, the multi-component mounting assembly 132 may be replaced by a unitary component that may be screwed into or otherwise secured to the lower end 130b of the hollow sleeve 130, and provide a recess for receiving and retaining the molded seat 146. Such component may have a counter-bore similar to that shown for the combined sleeve adaptor 142 and disk holder 144, or the recessed portion may have other geometries that may reduce the pressure gradient on the valve plug, such as conical, rounded and the like. Still further, mounting assembly 132 may be formed by other combinations of the components, or may be integrally formed with the hollow sleeve 130, while still providing a recessed bottom surface, a passage placing the inlet pressure in fluid communication with the interior of the hollow sleeve 130, and an attachment surface for the molded seat 146. Finally, it should be appreciated that while the present disclosure has been provided in the context of a pressure regulator, it may be successfully incorporated into other fluid process control devices including control valves, actuators, and any other foreseeable device.

In light of the foregoing, the description of the present disclosure should be understood as merely providing examples of the present invention and, thus, variations that do not depart from the gist of the invention are intended to be within the scope of the invention.

What is claimed is:

1. A regulator, comprising:
    a valve body defining a flow-path for a fluid and having a valve seat;
    an actuator casing coupled to the valve body;
    a control member disposed within the actuator casing and adapted for displacement relative to the valve body and the valve seat for regulating a flow of the fluid through the flow-path by moving between an open position in which the control member is spaced apart from the valve seat and a closed position in which the control member engages the valve seat; and
    a spring operatively coupled to the control member and biasing the control member toward the open position,
    wherein a bottom surface of the control member includes a recessed surface facing the valve seat and a through-bore, the recessed surface being formed by a counter-bore having a larger diameter portion proximate the valve seat and the through-bore having a smaller diameter portion distal to the valve seat, the through-bore extending through the counter-bore.

2. The regulator of claim 1, comprising a diaphragm subassembly disposed within the actuator casing and operatively coupled to the control member to move the control member in response to changes in an outlet pressure of the regulator.

3. The regulator of claim 1, wherein the control member comprises:
    a hollow sleeve; and
    a mounting assembly attached at an open end of the hollow sleeve proximate the valve seat and having the recessed surface.

4. The regulator of claim 3, wherein the mounting assembly comprises:
    a sleeve adaptor connected to the open end of the hollow sleeve; and a disk holder connected to the sleeve adaptor, wherein the recessed surface is defined by an opening through the disk holder and a counter-bore of the sleeve adaptor.

5. The regulator of claim 4, wherein the counter-bore of the sleeve adaptor comprises the larger diameter portion proximate the valve seat and the through-bore comprises smaller diameter portion distal to the valve seat, wherein the counter-bore and the through-bore place the fluid flow path in fluid communication with an interior of the hollow sleeve.

6. The regulator of claim 5, wherein the opening in the disk holder has a diameter that is identical to the diameter of the counter-bore.

7. The regulator of claim 4, wherein the disk holder has a bottom surface with an annular groove defined therein, the mounting assembly comprising an annular molded seat disposed within the groove and configured to engage the valve seat when the control member is in the closed position to prevent fluid flow through the valve body.

8. The regulator of claim 4, wherein the disk holder includes an outwardly extending flange having a top surface that engages the open end of the hollow sleeve.

9. The regulator of claim 1, wherein the recessed surface is perpendicular to the through-bore.

10. A mounting assembly for a control member of a regulator having a valve body defining a flow-path for a fluid and having a valve seat, an actuator casing coupled to the valve body, and a biasing element operatively coupled to the control member and biasing the control member toward an open position, wherein the control member is disposed within the actuator casing and is displaceable relative to the valve body and the valve seat for regulating a flow of the fluid through the flow-path by moving between the open position and a closed position wherein the control member engages the valve seat, the mounting assembly comprising:
 a connection portion configured to attach the mounting assembly to an end of the control member proximate the valve seat; and
 a bottom recessed surface facing the valve seat and a through-bore, the bottom recessed surface being formed by a counter-bore having a lamer diameter portion proximate the valve seat and the through-bore having a smaller diameter portion distal to the valve seat, the through-bore extending through the counter-bore.

11. The mounting assembly of claim 10, wherein the control member comprises a hollow sleeve and the connecting portion is attached at an open end of the hollow sleeve proximate the valve seat.

12. The mounting assembly of claim 11, comprising:
 a sleeve adaptor having the connection portion and connected to the open end of the hollow sleeve; and
 a disk holder connected to the sleeve adaptor, wherein the recessed surface is defined by an opening through the disk holder and a counter-bore of the sleeve adaptor.

13. The mounting assembly of claim 12, wherein the disk holder has a bottom surface with an annular groove defined therein, the mounting assembly comprising an annular molded seat disposed within the groove and configured to engage the valve seat when the control member is in the closed position to prevent fluid flow through the valve body.

14. A method of manufacturing a positioning device and a regulator valve comprising the positioning device, the method comprising:
 providing a control member, the control member having a hollow interior and a bottom recessed surface facing a valve seat at one end of the control member and a through-bore, the bottom recessed surface being formed by a counter-bore having a lamer diameter portion proximate the valve seat and the through-bore having a smaller diameter portion distal to the valve seat, the through-bore extending through the counter-bore;
 providing a biasing member;
 attaching a retention plate to the interior of the control member;
 threading an intermediate nut onto a first threaded end of a central rod;
 placing a second threaded end of the central rod through a central opening in the retention plate;
 inserting the central rod through the biasing member and through an opening in a spring seat so that the biasing member is disposed between the retention plate and the spring seat;
 attaching a first threaded nut onto the second threaded end of the central rod;
 preloading the positioning device; and
 attaching the positioning device to a regulator valve.

15. The method of claim 14, wherein preloading the positioning device includes tightening one of the intermediate nut and the first threaded nut.

16. The method of claim 14, further comprising attaching a second threaded nut onto the second threaded end of the central rod.

17. The method of claim 14, further comprising tightening the intermediate nut until a predetermined position is reached and confirmed by one or more markings on the central rod.

18. The method of claim 14, wherein attaching the positioning device to the regulator includes coupling a circumferential flange on an outer surface of the control member between two diaphragm plates in a casing.

* * * * *

UNITED STATES PATENT AND TRADEMARK OFFICE
CERTIFICATE OF CORRECTION

PATENT NO. : 8,590,858 B2  
APPLICATION NO. : 12/767427  
DATED : November 26, 2013  
INVENTOR(S) : Roper et al.

It is certified that error appears in the above-identified patent and that said Letters Patent is hereby corrected as shown below:

In the Specification:

At Column 4, line 53, "seat 192" should be -- seat 190 --.

In the Claims:

At Column 9, line 40, "lamer" should be -- larger --.

At Column 10, line 18, "lamer" should be -- larger --.

Signed and Sealed this

Thirteenth Day of October, 2015

Michelle K. Lee
*Director of the United States Patent and Trademark Office*